United States Patent
Pulley et al.

(10) Patent No.: US 6,754,292 B1
(45) Date of Patent: Jun. 22, 2004

(54) RECEIVER CIRCUIT

(75) Inventors: Douglas Roger Pulley, Bath (GB); Matthew James Collins, Bath (GB)

(73) Assignee: Conexant System, Inc., Newport Beach, CA (US)

( * ) Notice: Subject to any disclaimer, the term of this patent is extended or adjusted under 35 U.S.C. 154(b) by 592 days.

(21) Appl. No.: 09/617,588

(22) Filed: Jul. 18, 2000

(30) Foreign Application Priority Data

Jul. 19, 1999 (GB) ............................................. 9916895

(51) Int. Cl.$^7$ ............................. H04L 27/06; H04L 7/00
(52) U.S. Cl. ................................ 375/343; 375/354
(58) Field of Search ............................... 375/344, 343, 375/367; 348/418; 370/503

(56) References Cited

U.S. PATENT DOCUMENTS

| | | | | |
|---|---|---|---|---|
| 5,388,127 A | * | 2/1995 | Scarpa | 375/376 |
| 5,416,524 A | * | 5/1995 | Citta et al. | 348/471 |
| 5,590,160 A | | 12/1996 | Ostman | 375/367 |
| 5,920,555 A | * | 7/1999 | Hulbert | 370/342 |
| 6,137,847 A | * | 10/2000 | Stott et al. | 375/344 |
| 6,240,146 B1 | * | 5/2001 | Stott et al. | 375/344 |
| 6,459,744 B1 | * | 10/2002 | Helard et al. | 375/354 |

FOREIGN PATENT DOCUMENTS

| | | | | |
|---|---|---|---|---|
| EP | 0 798 903 A2 | 3/1997 | | H04L/27/26 |
| EP | 0 836 304 A2 | 10/1997 | | H04L/27/26 |
| GB | 2 307 155 A | 11/1996 | | H04L/27/26 |

* cited by examiner

*Primary Examiner*—Stephen Chin
*Assistant Examiner*—Lawrence Williams
(74) *Attorney, Agent, or Firm*—The Eclipse Group

(57) ABSTRACT

A receiver circuit is for processing a received signal which includes at least a first portion and a second portion which repeats the content of the first portion after a repeat interval. For example, the receiver may be for DVB-T signals using COFDM. Two correlation values are measured. The first is between the first portion of the received signal, delayed by the repeat interval plus a difference interval, and the second portion. The second is between the first portion of the received signal, delayed by the repeat interval minus a difference interval, and the second portion. Any difference between the correlation values represents a difference between the receiver sampling rate, and the required sampling rate, and can be used to adjust the receiver sampling rate.

6 Claims, 1 Drawing Sheet

RECEIVER CIRCUIT

TECHNICAL FIELD OF THE INVENTION

This invention relates to a receiver circuit, in particular for receiving signals in which a portion of a transmitted signal is repeated after a known time interval.

BACKGROUND OF THE INVENTION

The European DVB-T (Digital Video Broadcasting-Terrestrial) standard for digital terrestrial television (DTT) uses Coded Orthogonal Frequency Division Multiplexing (COFDM) of transmitted signals.

Received signals are sampled in a receiver, and accurate reception and demodulation of signals requires the sampling rate to be synchronized with the signal rate. For that purpose, DVB-T COFDM signals contain pilot signals which provide information allowing control of the sample rate. However, conventional techniques for extracting and using this information require considerable signal processing, with associated time delays.

SUMMARY OF THE INVENTION

It is an object of the present invention, in particular embodiments to provide a receiver which overcomes some of the disadvantages of the prior art.

This invention relates in a first aspect to a receiver which can conveniently extract information relating to the sample rate, as compared with the received signal rate, thereby advantageously allowing feedback control of the sample rate of the receiver.

According to a second aspect of the invention, there is provided a method of processing received signals, and controlling the sampling rate of a receiver.

In particular, according to the invention, there is provided a receiver circuit, comprising:
  a sampler, for taking digital samples of a received signal at a sampling rate, said received signal including at least a first portion and a second portion which repeats the content of the first portion after a repeat interval;
  at least one correlator for measuring:
  a first correlation between the first portion of the signal, delayed relative to the second portion by a first delay equal to the repeat interval plus a difference interval, and the second portion of the signal; and
  a second correlation between the first portion of the signal, delayed relative to the second portion by a second delay equal to the repeat interval minus a difference interval, and the second portion of he signal;
  means for comparing the measured first and second correlations to produce a comparison output; and
  means for controlling the sampling rate of the receiver on the basis of the comparison output in order to tend to equalize the first and second correlations.

DETAILED DESCRIPTION OF PREFERRED EMBODIMENTS

Figure 1:
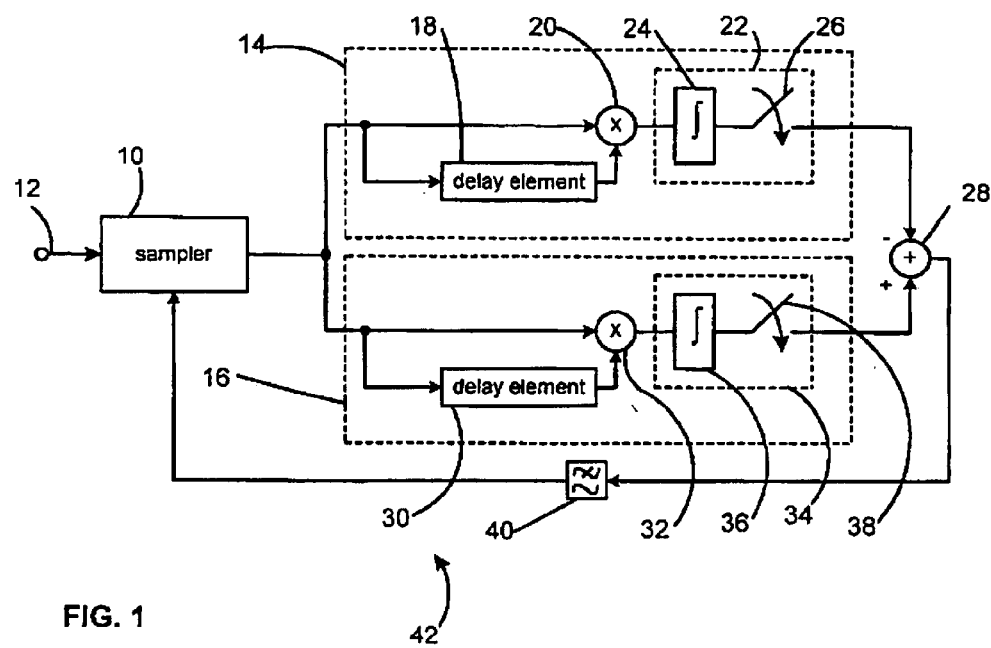
FIG. 1 is a schematic illustration of a part of a receiver circuit in accordance with the invention.

FIG. 1 shows a section of a receiver circuit relevant to the present invention. Typically, in the exemplary case of a digital terrestrial television signal receiver, for example receiving signals using the DVB-T standard with Coded Orthogonal Frequency Division Multiplexing, the receiver will include an antenna (not shown), and a tuner (not shown) for receiving the signals and downconverting to an intermediate frequency.

The receiver further includes a sampler 10 which receives signals after conversion to baseband at an input 12, and has a controllable sampling rate. For example, the sampler is preferably a voltage controlled crystal oscillator with an analog-digital converter or a digital resampler, for producing baseband digital I and Q samples. In this example, the sampler produces (64/7)Msamples/second in both I and Q.

It will be appreciated that the order in which signals are downconverted to baseband, converted to I and Q, and sampled, is not relevant to the invention.

It should also be noted that, while several parameters quoted herein relate specifically to the current United Kingdom specification for DVB-T, the values of such parameters are not relevant to the invention, which may be applied to any suitable signal format.

The sampled signal output from the sampler 10 is supplied to a first complex correlator 14 and a second complex correlator 16.

The received COFDM signal includes a portion which is repeated after a known and fixed time interval. Specifically, in this example, it includes a portion which is 64 samples long, and which is repeated after an interval (the repeat interval) of 2048 samples (measured from the start of the portion to the start of the repeated portion).

The first correlator 14 includes a first delay element 18, which applies a delay of half of one sample period less than the repeat interval. The delay could be chosen to be any value between zero and one, but the value of one half allows for easy implementation, amongst other things. Thus, with a repeat interval of 2048 samples, the first delay element 18 applies a delay of (2048−0.5) samples. A first correlator component 20, which can comprise a multiplier element, receives as a first input the signal from the sampler 10, and as a second input the delayed output from the delay element 18.

The correlation between these two inputs is determined on a sample-by-sample basis in the first correlator component 20, and output to a further block 22, also referred to as an integrate-and-dump device, which includes an integrator 24. It is appreciated by those skilled in the art that an integrate-and-dump device typically known as a matched filter which would include an accumulator (not shown).

The correlation result for each OFDM symbol, R, is the magnitude of the complex correlation across N samples of the cyclic repeat:

$$R = \left| \sum_{m=0}^{N-1} x_m x^*_{m+N_R} \right|$$

where * denotes the complex conjugate of a complex value, $x_k$ are the samples of the signal and $N_R$ is the number of samples (not necessarily an integer number) between a sample of the cyclic prefix and its repeat. In the case of the first correlation, $N_R=(2048-0.5)$. Either $x_m$ or $x_{m=N_R}$ may be conjugated in this calculation and m=0 is taken to be the start of the cyclic prefix for a particular symbol.

The integrator 24 adds the results of the individual sample-by-sample correlations determined by the first correlator component 20, and a switch 26 applies the sum of the correlations, measured over the whole 64 samples of the repeated portion of the signal, to a first input of a subtractor 28. A running correlation is used initially to find the position of the repeated portion of the signal, so that the correlations described above are calculated only for the repeated portion of the signal.

Similarly, the second correlator 16 includes a second delay element 30, which applies a delay of half of one sample period more than the repeat interval. Thus, with a repeat interval of 2048 samples, the second delay element 30 applies a delay of (2048+0.5) samples. That is, $N_R$=(2048+0.5). A second correlator component 32, which can comprise a multiplier element, receives as a first input the signal from the sampler 10, and as a second input the delayed output from the delay element 30.

The correlation between these two inputs is determined on a sample-by-sample basis in the second correlator component 32, and output to a further block 34, which includes an integrator 36. The integrator 36 adds the results of the individual sample-by-sample correlations determined by the second correlator component 32, and a sampling switch 38 applies the sum of the correlations, measured over the whole 64 samples of the repeated portion of the signal, to a second input of the subtractor 28.

The subtractor 28 therefore provides an output signal which is a measure of the difference between, on the one hand, the correlation of the input signal with a version of itself delayed by slightly more than the repeat period, and, on the other hand, the correlation of the input signal with a version of itself delayed by slightly less than the repeat period. This is supplied to a feedback loop filter 40 which appears in a feedback loop 42, and the output thereof is applied to the sampler 10 to control the sampling rate thereof.

For example, when the sampler is a resampler, the sample period thereof can be increased or decreased.

The feedback is of course controlled such that the change in the sampling period of the resampler acts to equalize the correlations.

It will be appreciated that the correlation need not be performed for the whole cyclic prefix, but could be performed on a selected portion of the prefix.

A more detailed explanation of the operation of the circuit will now be given with reference to FIG. 2.

Figure 2:
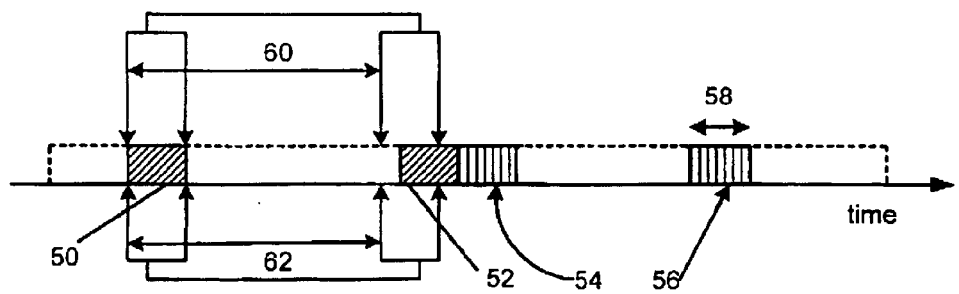
FIG. 2 is an explanatory diagram provided for a better understanding of the present invention.

FIG. 2 is a partial schematic illustration (not to scale) of the time history of a digitally sampled received COFDM signal. The signal includes a first portion 50, and a second portion 52, which is identical thereto and can therefore be seen as a repeat of the first portion. The signal also includes a third portion 54, and a fourth portion 56, which is identical thereto and can therefore be seen as a repeat of the third portion. For example, the first, second, third and fourth portions 50, 52, 54, 56 each have a duration 58 of 64 samples.

The start of the second portion is 2048 samples after the start of the first portion, and the start of the fourth portion is 2048 samples after the start of the third portion. Thus, the repeat period is 2048 samples. Therefore if either the first or third portion of the signal were delayed by 2048 samples, it would be found to be exactly correlated (ignoring distortions, noise, etc.) with the signal actually being received at that time.

The above description assumes that the sampling rate of the receiver is exactly synchronized with the sample rate of the transmitted signal. If the sampling rate is not exactly synchronized, then, in the sampled signal, the repeat period will appear as slightly more or slightly less than 2048 samples.

FIG. 2 also shows a delay 60, of slightly more than 2048 (e.g. 2048.5) samples as applied by the delay element 30, and a delay 62, of slightly less than 2048 (e.g. 2047.5) samples as applied by the delay element 18. If the sampling rate of the receiver is exactly synchronized with the sample rate of the transmitted signal, then the repeated portion 52 would be correlated with the two delayed versions to an almost exactly equal degree. If, by contrast, the sampling rate were slightly too high, compared with the sample ate of the transmitted signal, the repeated portion 52 would appear after slightly more than 2048 samples, and would therefore be more closely correlated with the version delayed by 2048.5 samples than with the version delayed by 2047.5 samples. Conversely, if the sampling rate were slightly too low, compared with the sample rate of the transmitted signal, the repeated portion 52 would appear after slightly less than 2048 samples, and would therefore be more closely correlated with the version delayed by 2047.5 samples than with the version delayed by 2048.5 samples.

Returning to FIG. 1, therefore, a zero output from the filter 40 is produced when the sampling rate of the receiver is nearly exactly synchronized with the sample rate of the transmitted signal, and produces no change in the sampling rate. However, a non-zero output from the filter 40 is produced when the sampling rate of the receiver is not exactly synchronized with the sample rate of the transmitted signal, and is fed back to control the sampler 10 to produce a change in the sampling rate. This change acts to bring the sampling rate of the receiver into synchronization with the sample rate of the transmitted signal.

There are therefore disclosed a receiver circuit, and a method of controlling a sampling rate therein, which allows exact synchronization (ignoring distortions, noise, etc.) to be achieved between the sampling rate and the received sample frequency.

What is claimed is:

1. A receiver circuit, comprising:
   a sampler, for taking digital samples of a received signal at a sampling rate, said received signal including at least a first portion and a second portion which repeats the content of the first portion after a repeat interval;
   at least one correlator for measuring:
      a first correlation between the first portion of the signal, delayed relative to the second portion by a first delay equal to the repeat interval plus a difference interval, and the second portion of the signal; and
      a second correlation between the first portion of the signal, delayed relative to the second portion by a second delay equal to the repeat interval minus the difference interval, and the second portion of the signal;
   means for comparing the measured first and second correlations to produce a comparison output; and
   means for controlling the sampling rate of the receiver on the basis of the comparison output in order to tend to equalize the first and second correlations.

2. A receiver circuit as claimed in claim 1, wherein the difference interval equals one half of one sample duration.

3. A receiver circuit as claimed in claim 1, wherein the at least one correlator measures the first and second correlations on a sample-by-sample basis, and further comprising at least one accumulator for summing the measured first and second correlations over the whole of the periods concerned.

4. A method for receiving a signal, the method comprising:
   taking digital samples of a received signal at a sampling rate, said received signal including at least a first portion and a second portion which repeats the content of the first portion after a repeat interval;

measuring a first correlation between the first portion of the signal, delayed relative to the second portion by a first delay equal to the repeat interval plus a difference interval, and the second portion of the signal; and measuring a second correlation between the first portion of the signal, delayed relative to the second portion by a second delay equal to the repeat interval minus the difference interval, and the second portion of the signal;

comparing the measured first and second correlations to produce a comparison output; and controlling the sampling rate of the receiver on the basis of the comparison output in order to tend to equalize the first and second correlations.

5. A method as claimed in claim 4, wherein the difference interval equals one half of one sample duration.

6. A method as claimed in claim 4, wherein the first and second correlations on a sample-by-sample basis, the method further comprising summing the measured first and second correlations over the whole of the periods concerned.

* * * * *